US006925185B2

(12) United States Patent
Chung

(10) Patent No.: US 6,925,185 B2
(45) Date of Patent: Aug. 2, 2005

(54) INTEGRATED DEVICE FOR TESTING TONE QUALITY OF A PLURALITY OF MICROPHONES

(75) Inventor: Ming-Cheng Chung, Taichung (TW)

(73) Assignee: Taky Electronics Co., Ltd., Ta-Li (TW)

( * ) Notice: Subject to any disclaimer, the term of this patent is extended or adjusted under 35 U.S.C. 154(b) by 742 days.

(21) Appl. No.: 09/934,709

(22) Filed: Aug. 23, 2001

(65) Prior Publication Data

US 2003/0039367 A1 Feb. 27, 2003

(51) Int. Cl.[7] ........................ H04R 29/00; H04R 11/04; H02B 1/00

(52) U.S. Cl. ......................... 381/58; 381/123; 381/361; 381/362; 381/363

(58) Field of Search .......................... 381/58, 123, 361, 381/362, 363, 366, 368

(56) References Cited

U.S. PATENT DOCUMENTS

| | | | | | |
|---|---|---|---|---|---|
| 4,591,671 | A | * | 5/1986 | Pinede et al. | 379/27.01 |
| H000413 | H | * | 1/1988 | Lelie | 381/58 |
| 5,561,737 | A | * | 10/1996 | Bowen | 704/275 |
| 5,805,717 | A | * | 9/1998 | Mills | 381/110 |
| 2002/0009206 | A1 | * | 1/2002 | Jorgensen et al. | 381/356 |

* cited by examiner

*Primary Examiner*—Sinh Tran
*Assistant Examiner*—Devona E. Faulk
(74) *Attorney, Agent, or Firm*—Bacon & Thomas, PLLC

(57) ABSTRACT

An integrated device is used to test the tone quality of a plurality of microphones. The device comprises a main body, and a control panel which is mounted on the main body and is provided with a plurality of receiving holes and switches corresponding in location to the receiving holes. The microphones are held in the receiving holes. The switches are used to control the sound pick-up effect of the microphones.

3 Claims, 2 Drawing Sheets

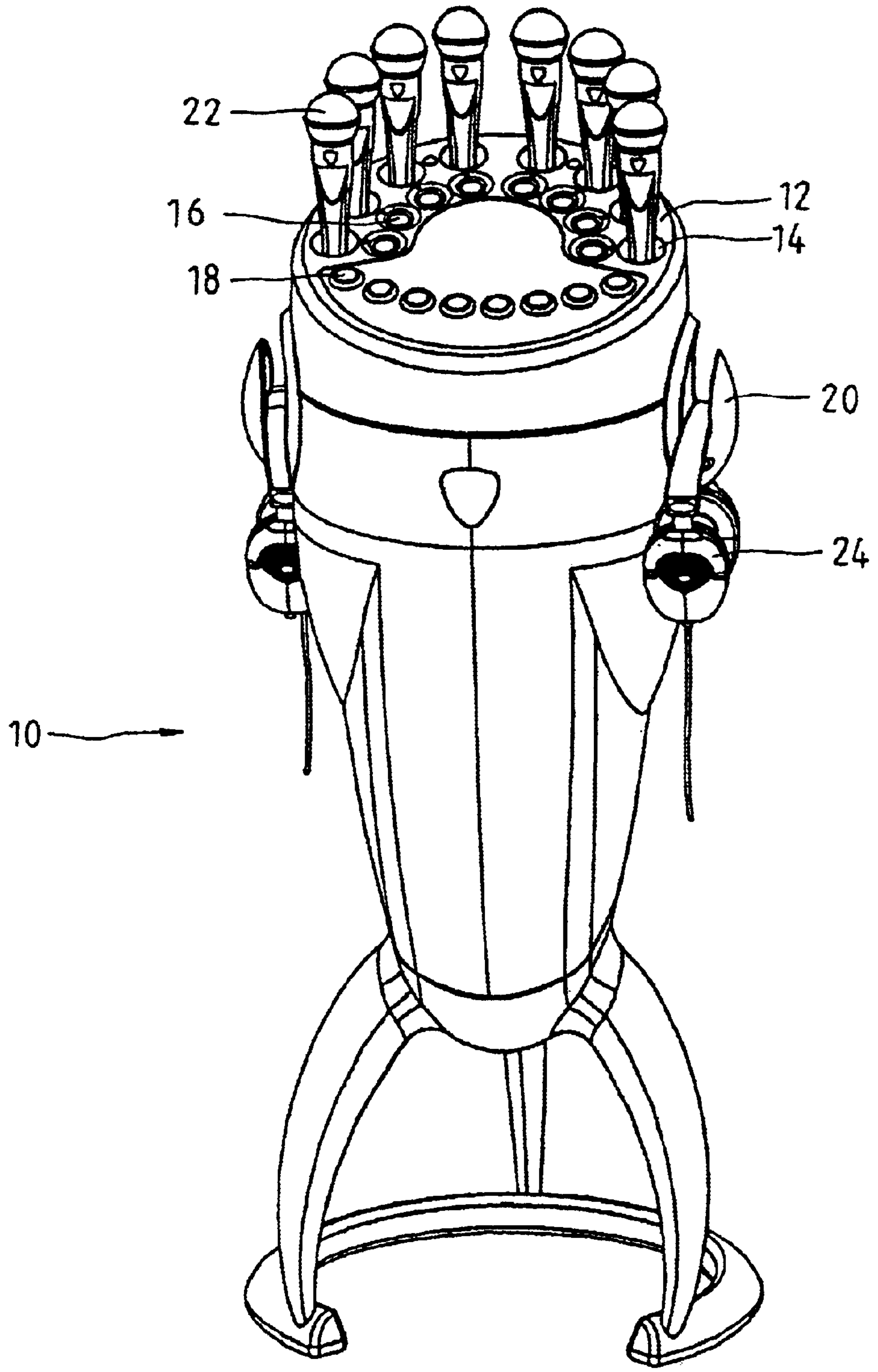
Fig • 1

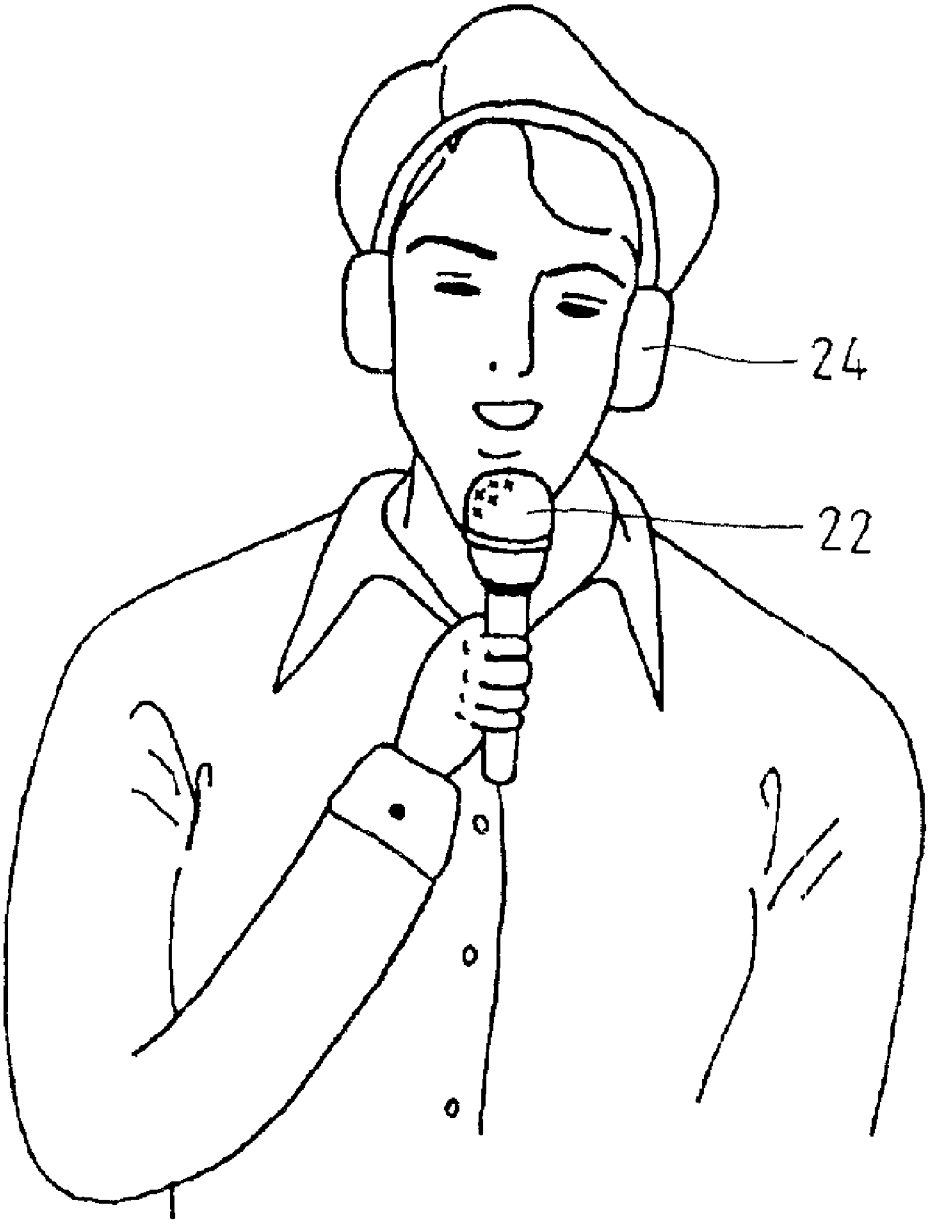
Fig • 2

INTEGRATED DEVICE FOR TESTING TONE QUALITY OF A PLURALITY OF MICROPHONES

FIELD OF THE INVENTION

The present invention relates generally to a microphone testing device, and more particularly to an integrated device for testing the tone quality of a plurality of microphones.

BACKGROUND OF THE INVENTION

A microphone user often depends on a testing device to select the microphone that is most suitable for him or her. The testing device is ubiquitous in a variety of places, such as nightclub, conference floor, bazaar, etc. The conventional testing device is used in conjunction with a sound reproducing system which may comprise a sound mixer, amplifiers, loud speakers, and the like. It is therefore readily apparent that the conventional testing device is not cost-effective and that the conventional testing device is incapable of testing objectively the tone quality of a plurality of microphone in view of the position nonuiformity or the circuit error of the tone quality control of the sound mixer. In addition, the precision of the conventional testing device is often compromised by the on-site noise.

SUMMARY OF THE INVENTION

The primary objective of the present invention is to provide an integrated device for testing the tone quality of a plurality of microphones. The device of the present invention is provided with a unified control of the tone quality for testing comparatively the tone quality of a plurality of microphones at a low cost.

The features and the advantages of the present invention will be more readily understood upon a thoughtful deliberation of the following detailed description of a preferred embodiment of the present invention with reference to the accompanying drawings.

BRIEF DESCRIPTION OF THE DRAWINGS

FIG. 1 shows a perspective view of the preferred embodiment of the present invention.

FIG. 2 shows a schematic view of the preferred embodiment of the present invention in use.

DETAILED DESCRIPTION OF THE PREFERRED EMBODIMENT

As shown in FIGS. 1 and 2, a device embodiment in the present invention comprises a main body 10 on which a control panel 12 is mounted. The control panel 12 is provided with a plurality of receiving holes 14 which are circularly arranged at intervals for receiving a plurality of microphones 22. The control panel 12 is further provided with a plurality of light-emitting diode (LED) indicator lamps 16 and press switches 18, which are corresponding in location to the receiving holes 14. The main body 10 is provided in two sides with a rack 20 for holding the earphone 24.

The main body 10 of the preferred embodiment of the present invention contains only one tone control circuit which is not the subject matter of the present invention. Once the tone quality is adjusted, the microphone 22 can be comparatively tested. When a specific microphone 22 is to be tested, a switch key 18 corresponding in location to that microphone 22 is pressed. As a result, the LED indicator lamp 16 corresponding in location to that microphone 22 and that switch key 18 is lit to confirm that the sound pick-up effect of that specific microphone 22 is activated. As that microphone 22 is being tested, the rest of the microphones 22 will not interfere with the testing of that specific microphone 22. The earphones 24 are provided to facilitate the evaluating of the tone output of that specific microphone 22 in question.

The device of the present invention has several advantages over the conventional device. In the first place, the device of the present invention has an integrated sound testing function which enables the sound testing of a plurality of microphones to be done efficiently and economically. In light of the device of the present invention making use of only one tone control circuit, a plurality of microphones can be tested comparatively and objectively. In addition, the external interference of the testing of the present invention is minimized by the earphones 24. Moreover, the device of the present invention does not take up a large floor space. More importantly, the device of the present invention is easy to use.

The embodiment of the present invention described above is to be regarded in all respects as being merely illustrative and not restrictive. Accordingly, the present invention may be embodiment in other specific forms without deviating from the spirit thereof. The present invention is therefore to be limited only by the scopes of the following claims.

What is claimed is:

1. An integrated device for testing tone quality of a plurality of microphones, comprising:

a main body;

a control panel mounted on said main body and provided with a plurality of receiving holes for receiving a plurality of microphones, said control panel further provided with a plurality of switches corresponding in location to said receiving holes, and a plurality of light-emitting diode (LED) indicator lamps corresponding in location to said receiving holes and said switches;

wherein one of said plurality of switches is activated to light up a corresponding LED indicator lamp for testing tone quality of a selected microphone.

2. The integrated device of claim 1, wherein said plurality of switches have a keyboard construction.

3. An integrated device for testing tone quality of a plurality of microphones, comprising:

a main body;

a control panel mounted on said main body and provided with a plurality of receiving holes for receiving a plurality of microphones, said control panel further provided with a plurality of switches corresponding in location to said receiving holes;

wherein said main body is provided with a plurality of racks for holding a plurality of earphones for use in evaluating the tone output of a microphone under test.

* * * * *